Patented Nov. 21, 1950

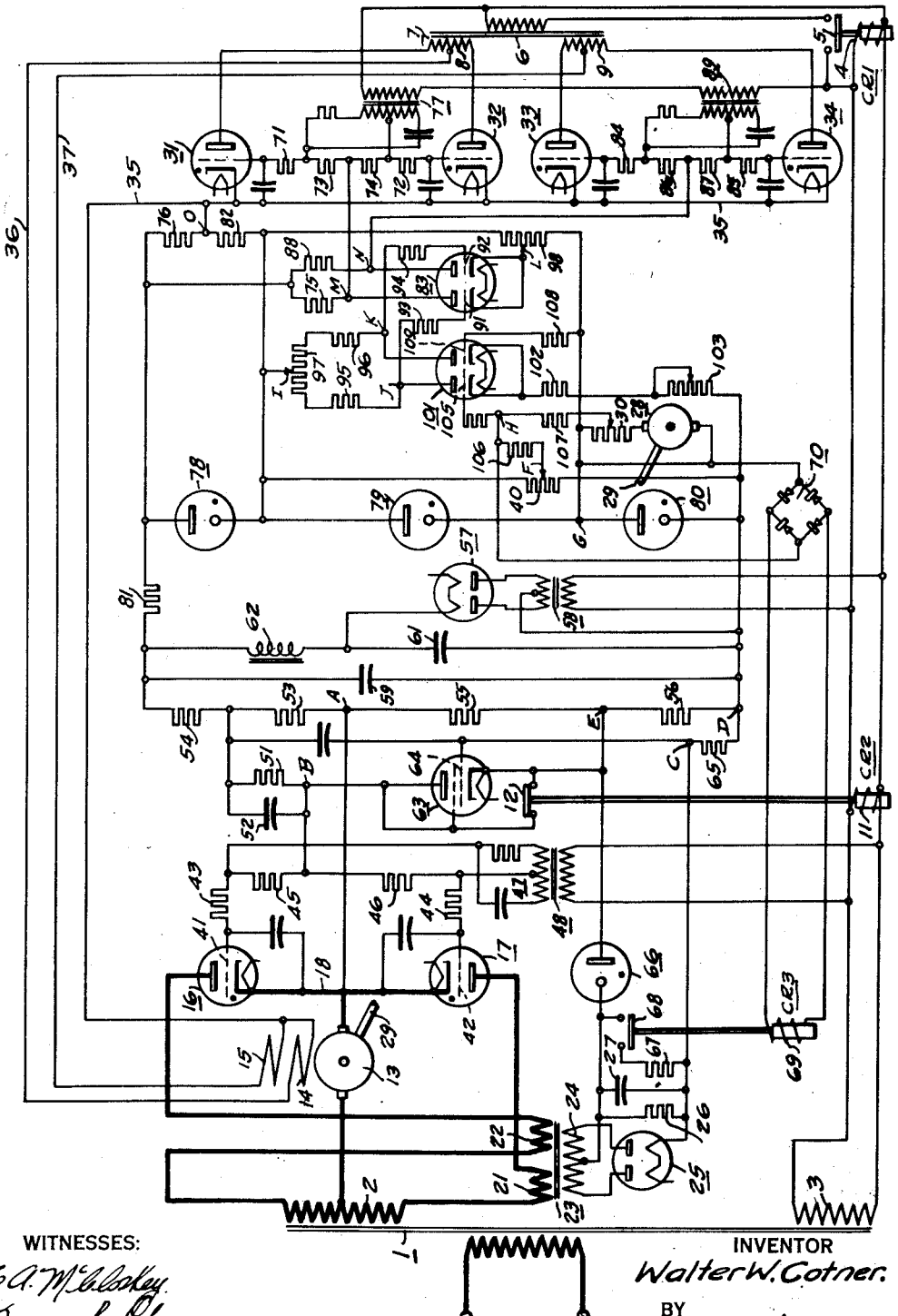

2,530,949

UNITED STATES PATENT OFFICE 2,530,949

ELECTRONIC SYSTEM FOR ENERGIZING
DIRECT-CURRENT MOTORS FROM AN
ALTERNATING CURRENT SUPPLY

Walter W. Cotner, Ithaca, N. Y., assignor to Westinghouse Electric Corporation, East Pittsburgh, Pa., a corporation of Pennsylvania Application August 10, 1948, Serial No. 43,446

21 Claims. (Cl. 318—260)

1

My invention relates to electronic systems for energizing a direct-current motor from an alternating-current source to operate at controllable or regulated speed or torque.

It is an object of the invention to provide drive systems of this type which are capable of regeneratively feeding energy back into the alternating-current line during braking or overhauling conditions and which require a reduced amount of electronic control tubes and associated circuit equipment for such regenerative operation as compared with known electronic systems while avoiding the use of reversing contactors in the armature and field circuit of the motor.

Another object of the invention is to provide control systems of the type referred to with relatively-simple but highly-reliable and readily-adjustable means for regulating or limiting the rectified armature current supplied to the motor.

Still another object of the invention is to design such systems in such a manner that the occurrence of high current peaks immediately subsequent to the starting moment of the motor is safely prevented, and to achieve such a peak limitation with the aid of circuit means of utmost simplicity.

As will be explained, the invention, in one of its aspects, provides for normal operation of the motor under constant armature current so that the direction and magnitude of torque or speed depend upon the controlled field excitation of the motor. Referring to this aspect, it is also an object of the invention to automatically raise the motor torque above the normal value during periods in which a considerable change in speed or torque is called for.

An object of the invention is also to provide a field-controlled reversible system which secures a sensitive and rapid response of the motor to changes in speed adjustment even at very low speeds, i. e., which affords a stiff control even under the adverse conditions of an only slight change in speed adjustment.

According to a feature of the invention, I provide the system with a split-field motor and connect the two field windings for mutually opposite torque with respective sets of electronic rectifiers whose cathodes are all connected to a common lead. This permits a considerable simplification of the grid circuits of the field rectifier tubes and leads to a reduction in the number of control tubes and accessory equipment needed for these rectifiers.

According to another feature of the invention, also for the purpose of obtaining a simple and reliable electronic control with a minimum of accessory tube circuits, I control the two field rectifiers by connecting two resistors in the respective grid circuits and impress on these two resistors two inversely variable voltages from the

2 respective output circuits of a push-pull amplifier which may comprise one or any desired plurality of stages, the input circuit of the amplifier being jointly controlled by an adjustable speed-reference voltage (pattern voltage) and a speed-measuring (pilot) voltage supplied, for instance, from a tachometer generator.

According to another feature of the invention, I provide an electronic rectifier for the motor armature circuit with current-limiting or current-regulating means which are controlled by the armature current and include a glow discharge tube and a resistor series connected to the tube so that a control voltage is impressed across the resistor only when the armature current exceeds a value determined by the breakdown voltage of the tube; and I apply the control voltage to the grid or control circuit of the armature rectifier to obtain the desired control or limitation of the armature current.

According to another feature of the invention, I connect the current-limiting or regulating means for the armature circuit by a voltage-responsive relay circuit with the control circuits of the field rectifiers so that the value of the regulated or limited armature current is automatically raised when the field rectifier control calls for a large change in the speed or torque of the drive. In this manner, a temporarily-increased torque is secured during accelerating, braking or reversing periods of the drive.

According to another feature of the invention, I control the armature rectifier by means of variable control voltage derived from across a plate load resistor of a control tube such as an amplifying vacuum tube, and I connect a capacitor across the load resistor in order to retard any abrupt or large change in control voltage, thus preventing or considerably limiting the current peaks that would otherwise occur in the armature circuit immediately following the starting moment and before the above-mentioned normally-operating current limit control is effective.

These and other objects and features of the invention will be apparent from the following description of the embodiment of the invention exemplified by the drawing.

In the following description, parenthetical references are given to commercial type designations of electronic tubes and to numerical values of electrical quantities. These references are presented only by way of example and not intended to be preclusive. The main purpose of the references to numerical values being to exemplify suitable relative orders of magnitude.

The system according to the drawing is energized from an alternating current line through a main transformer 1 with secondary windings 2 and 3. Winding 3 is connected to the coil 4 of a relay CR1 whose contact 5 connects the primary winding 6 of another transformer 7 to the secondary 3 when the secondary 3 is energized. Transformer 7 has two mid-tapped secondary windings 8 and 9. Connected to the secondary 3 is also the coil 11 of a relay CR2 which closes its contact 12 whenever the main transformer 1 is energized. It will be understood that if desired, the transformers 1 and 7 may be combined to a single transformer under omission of the relay CR1.

The direct-current motor to be energized and controlled has one terminal of its armature 13 connected to the mid-tap of secondary 2 and is equipped with two split field windings 14 or 15. The torque or running direction of the motor depends upon which of the two windings is excited or more excited than the other. The other terminal of armature 13 is connected through controllable rectifier tubes 16 and 17 to the respective ends of the secondary winding 2. Tubes 16 and 17 consist of arc discharge rectifiers, for instance thyratrons (type WL-672). Their respective cathodes have a common lead 18. Connected between the anodes of tubes 16 and 17 and the secondary 2 are the primary windings 21 and 22 of a current transformer 23 whose secondary 24 energizes a twin rectifier 25 (type 6X5). The rectified voltage appears across a resistor 26 (10,000 ohms) which is paralleled by a filtering capacitor 27 (1MFD). The voltage across capacitor 27 is substantially proportional to the armature current of the motor and, as is explained below, serves to provide a regulating stimulus for the armature rectifier tubes 16 and 17 so as to control these tubes to supply the motor with normally-constant armature surrent.

Connected with the motor armature 13 or with equipment driven by the motor is a tachometer generator 28, the connection being schematically indicated by a shaft 29. The voltage of generator 28 is impressed across a potentiometric rheostat 30 and is proportional to the motor speed.

The field winding 14 is excited by current supplied from the secondary 8 of transformer 7 and rectified by two full-wave connected rectifier tubes 31 and 32. Similarly, the field winding 15 receives excitation from the secondary 9 of transformer 7 through full-wave connected rectifier tubes 33 and 34. The field rectifiers 31, 32, 33 and 34 consist of controllable arc discharge tubes, for instance thyratrons (type 3C23). It is essential for the invention that the cathodes of the field rectifiers are all interconnected by a common lead 35. This leads to a considerable simplification of the control system and a reduction in the necessary accessory equipment. The common cathode lead 35 is attached to the common terminal of the split field windings 14 and 15. Lead 35 may be connected, if desired, with the frame of the tachometer generator 28 or may be grounded. The other end of winding 14 is connected through a lead 36 to the mid-point secondary 8. The other end of winding 15 is connected through a lead 37 to the mid-point of secondary 9.

When the system is in operation, the armature rectifiers 16, 17 are controlled in response to the current-measuring voltage from rectifier 25 to provide normally-constant current through the armature 13, and the field rectifiers 331, 32, 33 and 34 are controlled to vary the excitation of windings 14, and/or 15 so as to maintain the motor speed at a constant value determined by the setting of a speed control rheostat 40 whose voltage (pattern voltage) is compared with the speed-measuring voltage (pilot) voltage, from tachometer rheostat 30 so that the field rectifiers respond substantially to the differential effect of the two voltages. This will be understood from the more detailed description and explanation of the system components given presently.

The control grids 41, 42 of respective armature rectifier tubes 11, 12 are connected through respective resistors 43, 44 (each 220,000 ohms) across a series-connection of two resistors 45, 46 (each 10,000 ohms) which is impressed by alternating voltages through a fixed-phase shaft circuit 47 from a grid transformer 48 energized from secondary 3. Thus, an alternating component grid bias is applied to each tube in synchronism with the anode voltage and properly (for instance 90° or 120°) dephased relative thereto. The grid circuit for both tubes 11, 12 further extends from between resistors 45 and 46 through a resistor 51 (7500 ohms) paralleled by a capacitor 52 (6MMFD), thence through a resistor 53 (1300 ohms) connected at a point A to the cathode lead 18. The resistor 53 serves to impress on the grid circuit a constant bias voltage. To this end, the resistor 53 forms part of a voltage divider which includes, in series with resistor 53, the resistors 54 (10,500 ohms), 55 (6700 ohms), 56 (2100 ohms) and is energized by constant direct-current voltage (350 volts) from across a full-wave rectifier (type 5Y3) attached through a transformer 58 to the secondary 3 of transformer 1. The rectified voltage is filtered by capacitors 59 (10 MFD), 61 (8 MFD) and a reactor 62.

The above-mentioned resistor 51 in the grid circuit of the armature rectifiers represents another source of component grid voltage for that circuit and provides a variable unidirectional control voltage whose magnitude determines the phase position of the firing points of the armature rectifiers, and thus the rectified voltage and current of the armature. Resistor 51 is connected as a series load in the plate circuit of an amplifier tube 63 (type 6F6G) which receives fixed-plate excitation from across the resistors 53 and 55 of the above-mentioned voltage divider. The voltage across resistor 51 depends upon the conductance of tube 63, and this conductance is controlled by the voltage conditions of the appertaining grid circuit.

The grid circuit for control tube 63 extends from its control grid 64 through a resistor 64 (1500 ohms) and the resistor 56 (2100 ohms) to the cathode of tube 63 so as to be impressed by a constant grid bias voltage from the resistor 56 of the above-mentioned voltage divider. The control tube grid circuit has a parallel branch which extends from grid 64 through the resistor 26 and through a glow-discharge tube 66 to the control tube cathod. Tube 66 is preferably a cold-cathode tube as used for voltage regulating purposes (type VR 105). It conducts only when the voltage across its electrodes exceeds a given breakdown value (e. g. 105 volts). This occurs only when the current-measuring voltage across rheostat 26 exceeds a given value; i. e. when the armature current of the motor exceeds a given magnituue. However, a resistor 67 (4500 ohms) is provided and controlled by the contact 68 of a relay CR3 to reset the limit value of armature current at which tube 66 becomes conductive depending upon sufficient excitation supplied to the relay coil 69 from a rectifier 70.

Disregarding, for the time being, the change in conditions caused by the closing of relay CR3, the performance of the armature rectifier control described thus far is as follows.

Normally, the control tube 63 is biased to cut-off by the constant grid bias voltage from across the voltage divider resistor 56. Then there is no flow of plate current through resistor 51 and the point B (indirectly connected to the control grids of the armature rectifier tubes) has a positive potential relative to point A; i. e., relative to the cathodes of the armature rectifier tubes. The magnitude and polarity of point A with respect to B, together with the alternating component grid voltage derived from transformer 48 and the associated phase shift circuit 47, determines magnitude and polarity of the grid voltage with respect to the cathode for tubes 11 and 12. The amount by which point A is biased positive with respect to B is determined by the voltage drop in resistor 53. This voltage drop is so set that the tubes 11 and 12 can start to conduct near the start of an alternation.

As mentioned, the voltage across resistor 26 is substantially proportional to the armature current. When this voltage exceeds the operating value of tube 66, a current flows through tube 66 and in resistors 65, 56 through points C, D, E. This current makes point C positive with respect to D and point E less positive with respect to C. As a result, control tube 63 starts to conduct current through resistor 51. Due to the voltage drop now built up across resistor 51, point B becomes less positive with respect to point A, and then point B turns negative with respect to point A as the current in control tube 63 increases. Making point B less positive with respect to A decreases the current in the armature by decreasing the portion of the cycle periods during which the armature rectifier tubes 11 and 12, conduct current. Any momentary increase in armature current produces a decrease in the conducting intervals of tubes 11 and 12 and thus decreases the armature current. Consequently, the armature current is self-regulating and essentially constant during constant torque operation. Control tube 63 with resistor 51 may be thought of as a potentiometer which, due to the voltage drop of resistor 51, keeps point B at a positive potential with respect to A when tube 63 is not conducting and which changes the potential of point B to make it approach that of point E as a limit when tube 63 conducts maximum current. When tube 63 conducts maximum current, point B becomes negative with respect to point A approaching the amount of the voltage drop in resistor 55 as a limit. Thus, a variable control bias is "self-supplied" to the armature rectifier tubes 11 and 12.

The closing of contact 12 of relay CR2, which is open during motor operation, connects point B to point E and thus makes point B negative with respect to point A. This makes the control grids of tubes 11 and 12 sufficiently negative with respect to the respective cathodes to stop conduction and thus to interrupt the current supply to the motor. While contact 12 of relay CR2 is closed, resistor 51 conducts plate current and impresses the resultant voltage drop across capacitor 52, the terminal of capacitor 52 connected to the plate of tube 63 being negative. At the moment the motor is started; i. e., when after the energization of transformer 1 the relay CR2 opens its contact 12, the capacitor 52 is allowed to discharge through resistor 51. This causes point B to become less negative at a rate determined by the time constant of the circuit 51—52. This prevents or limits starting current peaks in tubes 11 and 12 until the automatic-current-limit control circuit 26—66—56—65 becomes effective.

From the foregoing description of design and performance of the control components associated with the armature rectifiers, it will appear that under the conditions so far examined the armature rectifier control has the tendency to regulate the armature rectifier for constant armature current with the exception of such transient current conditions as may occur during starting and accelerating or decelerating periods. It is thus apparent that in this system the motor speed and the direction of the motor torque depend upon the excitation conditions of the field windings 14, 15 and are controlled and regulated by the control equipment associated with the field rectifiers to be described presently.

The control grids of the field rectifier tubes 31, 32 for field winding 14 are connected by respective resistors 71, 72 (each 220,000 ohms) and respective resistors 73, 74 (each 10,000 ohms) to a point M whence the grid circuit extends through a resistor 75 (150,000) and a resistor 76 (10,000 ohms) to the common cathode lead 35. This grid circuit for field rectifier tubes 31, 32 has three sources of component grid voltages. One source comprises a grid transformer 77 with an associated phase shift circuit which is connected across resistors 73 and 74. Transformer 77 is energized from secondary 3. The alternating component grid voltage impressed across resistors 73 and 74 is synchronous with the plate voltage and properly dephased, for instance 90° relative thereto. A second source of grid voltage consists in the resistor 76 and provides a constant unidirectional grid bias. The constant bias voltage across resistor 76 is derived from the above-mentioned transformer 58 and rectifier 57 by a voltage-dividing circuit which has three voltage-resulting glow tubes 78, 79, 80 (type VR-105) connected across the capacitor 59; i. e., across the output terminals of the constant voltage supply, in series with each other and in series with a resistor 81 (5000 ohms). The constant voltage drop across tube 78 (105 volts) is applied across a series connection of resistor 76 with a resistor 82 (20,000 ohms), thus providing across resistor 76 the constant grid bias voltage above referred to. The third source of component grid voltage for field rectifier tubes 31, 32 is represented by the resistor 75 and provides a variable, unidirectional grid voltage whose magnitude determines the phase position of the firing points and hence the voltages applied to the motor field winding 14. This variable grid voltage is impressed on resistor 75 in one of the two plate circuits of a twin amplifier tube 83 (type 6SL7) as will be explained in a later place.

The control grids of the rectifier tubes 33, 34 for field winding 15 are connected by respective resistors 84, 85 (each 220,000 ohms) and respective resistors 86, 87 (each 10,000 ohms) to a point N whence the grid circuit extends through a resistor 88 (150,000) and resistor 76 to the common cathode lead 35. This grid circuit is also impressed by three component grid voltages comparable to those mentioned above with reference to the grid circuit for tubes 31, 32. One of the component grid voltages is alternating and is impressed across resistors 86 and 87 from a phase shift circuit and a grid voltage transformer 89 energized from secondary 3. A second component grid voltage is provided from across the resistor 76 and is unidirectional and constant as explained above. The third grid voltage appears across resistor 88 and is unidirectional but variable under control by the other discharge path of the tube 83.

The conductance of the two discharge paths in tube 83 and thus the amounts of variable voltage across resistors 75 and 88 are controlled by amplifier grid circuits which extend from the grids 91 and 92 of tube 83 through respective resistors 93, 94 (each 75,000 ohms) from whose tap or slider, at point I, the grid circuits extend jointly through a portion of a rheostat 98 to an appertaining slider or tap point L attached to the cathodes of tube 83. Rheostat 98 is connected across the voltage regulating tube 79 and hence impresses an adjusted constant bias on both grids 91, 92 of tube 83. The two grids are also subjected to variable voltages from across resistors 95 and 96, respectively, and these variable voltages are controlled by another amplifying tube 101 (type 6L27) with two discharge paths which include the two resistors 95 and 96 as a series load in the respective anode circuit.

The plate circuits of tube 101 receive energization of constant and regulated voltage from across the voltage divider tubes 79 and 80 through the above-mentioned rheostat 97 and through a resistor 102 (100,000 ohms) and an adjusting rheostat 103 (25,000 ohms).

The grid 105 of tube 101 for controlling the voltage drop in resistor 95 is connected through a resistor 106 (10,000 ohms) to a point H. Point H is connected through a resistor 106 (15,000 ohms) to the displaceable tap point on slider F of the speed control rheostat. Point H is also connected through a resistor 107 (20,000 ohms) to the tap or slider of the tachometer rheostat 30. The rheostat 30 has one end connected to a point G between the voltage divider tubes 79 and 80. Point G is also connected through a resistor 108 (10,000 ohms) to the grid 109 for controlling the voltage drop in the plate load resistor 96 of tube 101.

The speed control rheostat 40 is connected across the voltage divider tubes 79 and 80 and, therefore, impressed by constant voltage (210 volts). It is apparent that the slider or tap point F of rheostat 40 can be positioned so that its potential is the same as that of the point G between the tubes 79 and 80. The motor does not develop torque when slider F has the just-mentioned setting. A displacement of slider in one or the other direction, however, will cause the motor field to be excited for producing a torque whose direction and magnitude depends upon direction and magnitude of displacement of the slider. This will be explained presently. Assuming that point F is set so that it is electrically at the same potential as point G, then each grid of grids 105 and 109 in tube 101 is at the same potential as the tube cathode. The grids 105 and 109 may be set at or near the recommended quiescent grid potential by means of resistor 102 and rheostat 103. Then the voltage drop may be made the same from point I to point J as from point I to point K by means of potentiometer rheostat 97. Thus, both grids 91 and 92 are adjusted to have the same potential with respect to the cathode of tube 83. This may be called the "equilibrium setting" for point F on control rheostat 40. By adjusting the tap point L on potentiometer rheostat 98, the potential of each grid 91, 92 of tube 83 with respect to the cathodes may be brought within the proper quiescent operating potential.

The common cathode lead 85 of all field rectifier tubes 31, 32, 33, 34 is connected to the point O between the voltage divider resistors 76 and 82. By properly selecting the resistance value of either or both resistors 82, 76, the point O with respect to point M and with respect to point N may be set to such a potential that tubes 31, 32, 33, and 34 are biased at or near cut-off. Biasing the field rectifier tubes at cutoff, below cutoff or above cut-off each produces a different condition of operation any one of which may be more desirable for particular requirements or conditions of operation. Biasing the field tubes at more than cut-off gives a width to the setting of point F on the control rheostat 40 for zero speed. Biasing the field tubes a little above cut-off secures a quick response to small changes in the setting of point F and gives a very sharp setting for zero speed.

Assume now that relay CR2 has its contact 12 open; i. e., the armature tubes 16 and 17 are conducting, and that the point F or rheostat 40 is moved from the electrical point of G nearer to the high-voltage end of the rheostat 40 (i. e., point F is moved upwardly). The anode of tube 101 that is connected to point J now carries more current and, as a result of the common cathode resistor, the anode connected to point K carries less current. This push-pull action makes point J more negative with respect to point L, and point K less negative with respect to point L. As a result the one anode in tube 83 that is connected to point M carries less current, and the other anode connected to point N carries more current. Thus, point M is made more positive relative to the cathodes of tube 83; i. e., less negative with respect to point O; and point N becomes less positive relative to the cathodes of tube 83; i. e., more negative with respect to point O. As a result, tubes 31 and 32 conduct and field winding 14 controls the operation of the motor. Moving the point F towards the zero potential end of potentiometer rheostat 40, for analogical reasons, activates field rectifiers 33, 34, so that then the field winding 15 controls the operation of the motor. As mentioned, the fields produce mutually-opposite torques or directions of rotation.

As the motor starts to rotate and gains speed, the tachometer voltage increases and the pilot voltage tapped off from rheostat 30. Rheostat 30 is so connected that its potential relative to point G combines with the corresponding potential of point F so as to have the tendency to bring the potential of point H with respect to G to the equilibrium value. Thus, for a given torque and each setting of point F on the rheostat 40; i. e., for each adjusted pattern voltage, there is a tachometer speed and corresponding pilot voltage which produces equilibrium conditions at which the net motor field flux and the motor torque are zero.

If the motor overspeeds, the equilibrium condition is reached and may be departed from in a direction opposite that produced by the off-zero displacement of point F. In this case, the other field becomes excited and reverses the polarity of the armature terminals and regeneration can result.

If the motor is operating at a given speed and the point F is moved towards the no-speed equilibrium position, or beyond to a reversed torque position, the action is the same as if the motor were over-speeding, and a condition for regenerative operation is obtained.

The rectifier 70 for energizing the relay CR3 is connected between points H and G. Relay CR3 responds only when the voltage from rectifier 70 exceeds a given minimum. If a larger change in speed is called for by a large change in the position of point F, the difference in potential between points G and H becomes sufficient to cause the control relay CR3 to close its contact 68 thus shunting resistor 67 around resistor 26. This decreases the voltage across resistor 26 for a given armature current so that for the control of tube 63 an equilibrium condition is reached at a higher value of armature current than previously. The ratio of armature current after the closing of relay CR3 to the armature current prior thereto can be controlled by the magnitude of resistor 67 which may either have a properly chosen fixed resistance or may be adjustable.

The change in armature current and motor torque caused by the response of relay CR3 is additive to the changes in torque called for by the large displacement of slider point F. In this manner, an increased torque is temporarily effective during acceleration and deceleration periods. A similar functioning can be obtained by connecting coil 69 of relay CR3 directly to points G and H thus eliminating the rectifier 70. It should also be understood that the relay connection between the grid circuit of the control tube 63 for the armature rectifier and the grid control circuits for the field rectifiers may consist of electronic circuit dividers instead of the illustrated electromagnetic relay means. For instance, resistor 67 with relay CCR and bridge rectifier 70 may be replaced by a vacuum tube whose plate circuit provides a grid voltage for tube 63 and whose grid circuit is controlled by the difference in potential between points H and G. An electromagnetic relay in conjunction with a rectifier 70 composed of copper oxide units has been chosen for illustration because the current-versus-voltage characteristic of such type rectifier makes them especially suitable for producing rated torque with small changes in speed near zero speed; i. e., it makes the control system "stiff" with respect to overhaul or with respect to speed changes at very low speeds. The invention, of course, is not limited to or predicated upon this particular control connection.

If relay CR2 is closed and the motor stopped when the point F is off the zero-speed equilibrium position, one or the other of the fields is fully excited and provides full field for accelerating when the motor is again started.

While in the foregoing I have specifically described a control system with full-wave connected armature and field rectifiers, it is obvious that, for lesser requirements, single-phase rectification can be substituted or that only one tube of a dual tube rectifier need be grid controlled, for instance, in the manner disclosed for a field rectifier in the copending application, Serial No. 25,194 of W. R. Roman, filed May 5, 1948, now Patent No. 2,504,155 issued on April 18, 1950 assigned to the assignee of the present invention. On the other hand, polyphase rectifiers in field or armature circuit or both are also applicable. Any of the illustrated twin tubes 25, 57, 83, 101, of course, may be replaced by two separate tubes. The tubes 101 and 83 and their associated circuits will be recognized as a double-stage amplifier, and it will be evident that for some purposes a single-stage amplifier may suffice, while, if desired, more than two stages are also applicable.

Other modifications and changes applicable in such systems can be made within the objects and essential features of the invention, and it will be obvious to those skilled in the art, upon a study of this disclosure, that the invention can be reduced to practice in embodiments other than that specifically exemplified, without departing from the claims annexed hereto.

I claim as my invention:

1. A drive system, comprising a direct-current motor having an armature and two field windings of mutually opposing field polarities, alternating-current supply means, a rectifier connecting said armature to said means, two controllable electronic field rectifiers connecting said means to said respective windings and having a common cathode lead and respective grid circuits connected with said lead, and control means for providing variable grid voltage, said grid circuits being connected to said control means to respond in mutually inverse relation to said voltage whereby one of said field rectifiers, dependent upon the direction of departure of said voltage from a given value, is controlled to excite the appertaining one field winding in accordance with the magnitude of said departure.

2. A drive system, comprising a direct-current motor having an armature and two field windings of mutually opposing field polarities, alternating-current supply means, a rectifier connecting said armature to said means, two controllable field rectifiers connecting said means to said respective windings, each field rectifier having a plurality of full-wave connected tubes and all said tubes having a cathode lead in common, said field rectifiers having respective grid circuits connected with said common lead and having respective voltage source means for providing respective controllable grid voltages, and control means for providing variable grid voltage, said grid circuits being connected to said control means to respond in mutually inverse relation to said voltage whereby one of said field rectifiers, dependent upon the direction of departure of said voltage from a given value, is controlled to excite the appertaining one field winding in accordance with the magnitude of said departure.

3. A drive system, comprising a direct-current motor having an armature circuit and a field winding, alternating-current supply means, a controllable armature rectifier connecting said armature circuit to said supply means and having a control circuit, regulating means responsive to the current in said armature circuit and connected to said control circuit for controlling said armature rectifier to normally maintain said current at a given value, a controllable field rectifier connecting said field winding to said supply means and having a grid circuit, control means connected with said grid circuit for providing variable control voltage therefor in order to control said field rectifier, and voltage-responsive circuit means connecting said regulating means with said control means for causing said armature rectifier to increase said current above said value when said control voltage exceeds a predetermined magnitude.

4. A drive system, comprising a direct-current motor having an armature circuit and a field winding, alternating-current supply means, a controllable armature rectifier connecting said armature circuit to said supply means and having a control circuit, regulating means responsive to the current in said armatre circuit and connected to said control circuit for controlling said armature rectifier to normally maintain said current at a given value, a controllable field rectifier connecting said field winding to said supply means and having a grid circuit, an adjustable voltage source of pattern voltage indicative of the desired motor speed, a source of speed-responsive pilot voltage, said two voltage sources being interconnected and attached to said grid circuit for jointly controlling said field rectifier in dependence upon the departure of said pilot voltage from a given relation to said pattern voltage, adjusting means connected with said regulating means and attached to said voltage sources and controlled thereby for causing said armature rectifier to increase said current above said value when said departure exceeds a predetermined magnitude.

5. A drive system, comprising a direct-current motor having an armature circuit and a field winding, alternating-current supply means, a controllable armature rectifier connecting said armature circuit to said supply means and having a control circuit, circuit means having a first resistor connected with said armature circuit to provide across said resistor a voltage substantially proportional to the armature current and having a glow discharge tube and a second resistor series connected with each other across said first resistor to conduct discharge current when said armature current reaches a given value, said second resistor being connected with said control circuit to provide it with a voltage drop due to said discharge current so as to cause said armature rectifier to normally maintain said armature current at said value, and direct-current supply means of controllable voltage connected to said field winding.

6. A drive system, comprising a direct-current motor having an armature circuit and a field winding, alternating-current supply means, a controllable armature rectifier connecting said armature circuit to said supply means and having a control circuit, grid voltage supply means disposed in said control circuit and including a resistance member, a control tube having a plate circuit which includes said member to impress variable voltage thereon and having a grid circuit for controlling said variable voltage, circuit means having a first resistor connected with said armature circuit to provide across said resistor a voltage substantially proportional to the armature current and having a glow discharge tube and a second resistor series connected with each other across said first resistor to conduct glow discharge current when said armature current reaches a given value, said second resistor being connected w'th said grid circuit for causing said tube to control said armature rectifier to normally maintain said armature current at said value, and direct-current supply means of controllable voltage connected to said field winding.

7. A drive system, comprising a direct-current motor having an armature circuit and a field winding, alternating-current supply means, a controllable armature rectifier connecting said armature circuit to said supply means and having a control circuit, a current transformer primarily connected with said armature circuit and having a secondary circuit with an auxiliary rectifier, resistance means connected to said auxiliary rectifier to be impressed by rectified voltage substantially proportional to the armature current, a discharge tube of a given breakdown voltage and a resistor series connected across said resistance means so that voltage is impressed across said resistor when said tube conducts, said resistor being connected with said control circuit for controlling said armature rectifier to maintain said current normally at a constant value, and direct-current supply means of variable voltage connected to said field winding.

8. A drive system, comprising a direct-current motor having an armature circuit and a field winding, alternating-current supply means, a controllable armature rectifier connecting said armature circuit to said supply means and having a control circuit, a current limit device having resistance means connected with said armature circuit and having a glow discharge tube and a resistor series connected with each other across said resistance means, said resistor being connected with said control circuit for controlling said armature rectifier to normally maintain the armature current at a given value, adjustable voltage supply means connected to said field winding for providing controllable excitation for said winding, and voltage-responsive relay means connected with said voltage supply means and connected to said resistance means for controlling said resistance means to raise said current above said value when said excitation exceeds a given value.

9. A drive system, comprising a direct-current motor having an armature circuit and a field winding, alternating-current supply means, a controllable armature rectifier connecting said armature circuit to said supply means and having a control circuit, a current limit device having resistance means connected with said armature circuit to provide a voltage substantially proportional to the armature current and having a glow discharge tube and a resistor series connected with each other across said resistance means, said reistor being connected with said control circuit for controlling said armature rectifier to normally maintain the armature current at a given value, a controllable field rectifier connecting said field winding to said supply means and having a grid circuit, an adjustable voltage source of pattern voltage indicative of the desired motor speed, a source of speed-responsive pilot voltage, said two voltage sources being interconnected and attached to said grid circuit for jointly controlling said field rectifier in dependence upon the departure of said pilot voltage from a given relation to said pattern voltage, voltage-responsive relay means connected to said sources and responsive to said voltage difference, said relay means being connected with said device for controlling said device to raise said armature current above said value when said difference exceeds a predetermined magnitude.

10. A drive system, comprising a direct-current motor having an armature circuit and a field winding, alternating-current supply means, a controllable armature rectifier connecting said armature circuit to said supply means and having a control circuit, a current limit device having resistance means connected with said armature circuit and having a glow discharge tube and a resistor series connected with each other across said resistance means, said resistor being connected with said control circuit for controlling said armature rectifier to normally maintain the armature current at a given value, a controllable field rectifier connecting said field winding to said supply means and having a grid circuit, control means responsive to the motor speed for providing a variable control voltage, an auxiliary junction-type full-wave rectifier connected to said control means to be energized in dependence upon said control voltage, and a relay circuit connected between said auxiliary rectifier and said device for controlling said device to raise said armature current above said value when said control voltage exceeds a predetermined magnitude.

11. A drive system, comprising a direct-current motor having an armature circuit and a field winding, alternating-current supply means, a controllable armature rectifier connecting said armature circuit to said supply means and having a control circuit, a current limit device having a resistance member connected with said armature circuit to provide a voltage substantially proportional to the armature current and having a glow discharge tube and a resistor series connected with each other across said resistance member, said resistor being connected with said control circuit for controlling said armature rectifier to normally maintain the armature current at a constant value, a controllable field rectifier connecting said field winding to said supply means and having a grid circuit, control means connected with said grid circuit for providing variable control voltage therefor in order to control said field rectifier, a full-wave rectifier unit composed of copper oxide rectifiers, an electromagnetic relay having a contact and having a coil connected through said rectifier unit to said control means for actuating said contact when said control voltage exceeds a given magnitude, and a resistor connected in parallel to said resistance member when said contact is actuated.

12. A drive system, comprising a direct current motor having an armature circuit and a field circuit, controllable voltage supply means connected to said field circuit, alternating-current supply means, a controllable rectifier tube connecting said armature circuit with said current supply means and having a control circuit, an amplifying control tube having a plate circuit with a load resistor and having a grid circuit for controlling the voltage drop in said resistor, said resistor being connected in said control circuit for controlling said rectifier tube by said voltage drop, a direct-current source of constant voltage having a voltage divider connected to said grid circuit and to said control circuit to provide respective constant grid bias voltages for said tubes, said bias voltages being dimensioned to normally bias said control tube to cut-off and to bias said rectifier tube for substantially full conductance, and a current limit circuit connected with said armature circuit and having resistance means connected in said grid circuit for imposing on said grid circuit a voltage responsive to the current in said armature circuit so as to cause said control tube to reduce the conductance of said rectifier tube when said armature current reaches a given value.

13. A drive system, comprising a direct-current motor having an armature circuit and a field circuit, controllable voltage supply means connected to said field circuit, alternating-current supply means, a controllable rectifier tube connecting said armature circuit with said current supply means, and having a control circuit, an amplifying control tube having a plate circuit with a load resistor and having a grid circuit for controlling the voltage drop of said resistor, said resistor being connected in said control circuit for controlling said rectifier tube by said voltage drop, a direct-current source of constant voltage having a voltage divider connected to said grid circuit and to said control circuit to provide respective constant grid bias voltages for said tubes, said bias voltages being dimensioned to normally bias said control tube to cut-off and to bias said rectifier tube for substantially full conductance, current limit means having a resistance member connected with said armature circuit to be impressed by voltage substantially proportional to the current in said armature circuit, a glow tube and resistance means series connected across said resistance member for causing in said resistance means a voltage drop only when said current exceeds a value at which said glow tube is conductive, said resistance means being connected in said grid circuit for having said latter voltage drop cause said control tube to reduce the conductance of said rectifier tube.

14. A drive system, comprising a direct-current motor having an armature circuit and a field circuit, voltage supply means connected to said field circuit, alternating-current supply means, a controllable rectifier tube connecting said armature circuit with said current supply means and having a control circuit, an amplifying control tube having a plate circuit with a load resistor and having a grid circuit for controlling the voltage drop of said resistor, said resistor being connected in said control circuit for controlling said rectifier tube by said voltage drop, a direct-current source of constant voltage having a voltage divider connected to said grid circuit and to said control circuit to provide respective constant grid bias voltages for said tubes, said bias voltages being dimensioned to normally bias said control tube to cut-off and to bias said rectifier tube for substantially full conductance, and a condition-responsive relay having contact means connected, on the one hand, to a point of said voltage divider negative with respect to the grid potential of said normal bias voltage of said control tube and, on the other hand, to a point near the grid end of said grid circuit so that the response of said relay causes said control tube to conduct sufficient current through said resistor for rendering said rectifier tube non-conductive.

15. A drive system according to claim 14, comprising a transformer winding forming part of said current supply means, said relay having a control coil connected with said transformer winding so as to open said contact when the voltage of said current supply means is above a given minimum value.

16. A drive system according to claim 12, comprising a capacitor connected across said load resistor for delaying the change in voltage drop of said resistor during starting intervals in order to prevent excessive current peaks in said armature circuit before said current limit circuit becomes operative.

17. A drive system, comprising a direct-current motor having an armature circuit and a field circuit, voltage supply means connected to said field circuit, alternating-current supply means, a controllable rectifier tube connecting said armature circuit with said current supply means and having a control circuit, a control tube having a plate circuit with a load resistor and having a grid circuit for controlling the voltage drop of said resistor, said resistor being connected in said control circuit for controlling said rectifier tube by said voltage drop, a current limit circuit connected with said armature circuit and having resistance means connected in said grid circuit for imposing on said grid circuit a voltage responsive to the current in said armature circuit so as to cause said control tube to reduce the conductance of said rectifier tube with increasing armature current, and a capacitor connected across said load resistor for delaying the change in voltage drop of said resistor during starting intervals in order to prevent excessive current peaks in said armature circuit before said current limit circuit becomes operative.

18. A drive system, comprising a direct-current motor having an armature circuit and two split field windings, said two windings having an intermediate circuit point in common, alternating-current supply means, an armature rectifier connecting said armature circuit to said supply means, two controllable field rectifiers connecting said respective windings to said supply means and having respective cathode and respective grid circuits, said cathodes having a common lead attached to said circuit point, bias voltage supply means connected with said grid circuit for normally biasing said field rectifiers near cut-off, two resistors connected in said respective grid circuits to impress respective variable grid voltages thereon, a push-pull amplifier having two plate circuits which include said respective resistors and having two grid circuits for controlling said respective variable voltages, control means for providing a variable control voltage attached to said amplifier grid circuits so as to control them in mutually inverse relation whereby one field rectifier, dependent upon the polarity of said control voltage, energizes the appertaining winding in dependence upon the magnitude of said control voltage.

19. A drive system, comprising a direct-current motor having an armature circuit and two split field windings, said two windings having an intermediate circuit point in common, alternating-current supply means, an armature rectifier connecting said armature circuit to said supply means, two controllable field rectifiers connecting said respective windings to said supply means and having respective cathodes and respective grid circuits, said cathodes having a common lead attached to said circuit point, bias voltage supply means connected with said grid circuit for normally biasing said field rectifiers near cut-off, two resistors connected in said respective grid circuits to impress respective variable grid voltages thereon, a push-pull amplifier having two plate circuits which include said respective resistors and having two grid circuits for controlling said respective variable voltages, a voltage source having an adjustable potentiometric rheostat for providing adjustable pattern voltage in accordance with the desired motor speed, a source of speed-responsive pilot voltage, said two voltage sources being interconnected and attached to said amplifier grid circuits so as to control them in inverse relation to each other in dependence upon the departure of said pilot voltage from a given ratio to said pattern voltage whereby one field rectifier, dependent upon the direction of said departure, energizes the appertaining field winding in dependence upon the magnitude of said departure.

20. A drive system, comprising a direct-current motor having an armature circuit and two split field windings, said two windings having an intermediate circuit point in common, alternating-current supply means, a controllable armature rectifier connecting said armature circuit to said supply means and having a control circuit, current limit means attached to said armature circuit and connected with said control circuit for controlling said armature rectifier in response to the current in said armature circuit to normally maintain said current constant, two controllable field rectifiers connecting said respective windings to said supply means and having respective cathodes and respective grid circuits, said cathodes having a common lead attached to said circuit point, bias voltage supply means connected with said grid circuit for normally biasing said field rectifiers near cut-off, two resistors connected in said respective grid circuits to impress respective variable grid voltages thereon, a push-pull amplifier having two plate circuits which include said respective resistors and having two grid circuits for controlling said respective variable voltages, a voltage source having an adjustable potentiometric rheostat for providing adjustable pattern voltage in accordance with the desired motor speed, a source of speed-responsive pilot voltage, said two voltage sources being interconnected and attached to said amplifier grid circuits so as to control them in mutually inverse relation to each other in dependence upon the departure of said pilot voltage from a given ratio to said pattern voltage whereby one field rectifier, dependent upon the direction of said departure, is controlled to energize the appertaining field winding dependent upon the magnitude of said departure.

21. A drive system, comprising a direct-current motor having an armature and two split field windings, alternating-current supply means, rectifying circuit means for supplying substantially constant current to said armature from said supply means, two controllable gas discharge rectifiers normally non-conductive and having respective grid circuits with respective resistors to provide variable grid voltages to render said discharge rectifiers conductive, said rectifiers having a cathode conductor in common and said grid circuits being attached to said conductor, electronic amplifying means having two output circuits which include said respective resistors and having respective grids and appertaining grid circuits with a common cathode lead, a constant voltage source having a voltage divider with two points of fixed potential difference connected to said lead and to one of said grids respectively, a rheostat connected to said source and having an adjustable tap connected to said other grid so that said two voltages are equal to cause zero torque in said motor when said tap is in a given position and vary in inverse relation to each other when said tap is displaced from said position to cause firing of either discharge rectifier depending upon the direction of tap displacement, and a tachometer generator connected with said lead and with said tap for varying said voltages relative to each other in the opposite sense in dependence upon the drive speed to make said voltages equal when said speed corresponds to the displaced position of said tap.

WALTER W. COTNER.

REFERENCES CITED

The following references are of record in the file of this patent:

UNITED STATES PATENTS

| Number | Name | Date |
|---|---|---|
| 2,312,117 | Moyer et al. | Feb. 23, 1943 |
| 2,404,641 | Leigh | July 23, 1946 |
| 2,421,632 | Livingston | June 3, 1947 |